(12) United States Patent
Miller et al.

(10) Patent No.: US 7,592,489 B2
(45) Date of Patent: Sep. 22, 2009

(54) ANIONIC/CATIONIC MASONRY SEALING SYSTEMS

(75) Inventors: Chandra Tier Miller, Bear, DE (US); Andrea Miller-Simmons, legal representative, Bronx, NY (US); Faye Michelle Corman, Barrington, NJ (US); Ernest Byron Wysong, Hockessin, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 625 days.

(21) Appl. No.: 11/200,598

(22) Filed: Aug. 10, 2005
(Under 37 CFR 1.47)

(65) Prior Publication Data
US 2006/0047044 A1 Mar. 2, 2006

Related U.S. Application Data

(63) Continuation of application No. 10/931,848, filed on Sep. 1, 2004, now abandoned.

(51) Int. Cl.
C08F 9/28 (2006.01)
(52) U.S. Cl. ............................ 568/8; 435/1.1; 514/52; 514/75; 524/589; 568/11
(58) Field of Classification Search .................... 568/8, 568/11; 524/589; 514/75, 52; 435/1.1
See application file for complete search history.

(56) References Cited

U.S. PATENT DOCUMENTS

| | | | |
|---|---|---|---|
| 3,282,905 A | 11/1966 | Fasick et al. | |
| 4,145,382 A | 3/1979 | Hayashi et al. | |
| 4,147,851 A | 4/1979 | Reynolds | |
| 4,499,146 A | 2/1985 | Piacenti et al. | |
| 4,745,009 A | 5/1988 | Piacenti et al. | |
| 4,746,550 A | 5/1988 | Strepparola et al. | |
| 4,764,431 A | 8/1988 | Piacenti et al. | |
| 4,902,538 A | 2/1990 | Piacenti et al. | |
| 4,931,505 A | 6/1990 | Miyazaki et al. | |
| 5,077,097 A | 12/1991 | Moggi et al. | |
| 5,250,106 A * | 10/1993 | Roth et al. ..................... | 106/2 |
| 5,439,998 A | 8/1995 | Lina et al. | |
| 5,481,028 A * | 1/1996 | Petrov et al. ................. | 560/184 |
| 5,691,000 A | 11/1997 | Montagna et al. | |
| 5,712,240 A | 1/1998 | Tyerech et al. | |
| 5,798,415 A | 8/1998 | Corpart et al. | |
| 5,919,527 A | 7/1999 | Fitzgerald et al. | |
| 5,990,212 A | 11/1999 | Hager et al. | |
| 6,120,892 A | 9/2000 | Fitzgerald et al. | |
| 6,197,382 B1 | 3/2001 | Ornstein et al. | |
| 6,271,289 B1 * | 8/2001 | Longoria et al. ............. | 524/133 |
| 6,296,905 B1 | 10/2001 | Slavid et al. | |
| 6,361,871 B1 | 3/2002 | Jenkner et al. | |
| 6,383,569 B2 * | 5/2002 | Ornstein et al. .......... | 427/389.7 |
| 6,503,988 B1 | 1/2003 | Kitahara et al. | |
| 6,518,380 B2 | 2/2003 | Didier et al. | |
| 2001/0043988 A1 | 11/2001 | Ornstein | |
| 2002/0058164 A1 | 5/2002 | Slavid et al. | |
| 2002/0142097 A1 | 10/2002 | Giacobbi et al. | |
| 2003/0083448 A1 | 5/2003 | Fan et al. | |
| 2003/0087031 A1 | 5/2003 | Slavid et al. | |
| 2003/0105263 A1 | 6/2003 | Cote et al. | |
| 2006/0047032 A1 * | 3/2006 | Miller et al. ................. | 524/127 |

FOREIGN PATENT DOCUMENTS

| | | |
|---|---|---|
| EP | 374803 | 6/1990 |
| EP | 494082 | 7/1992 |
| EP | 533159 | 3/1993 |
| EP | 689908 | 1/1996 |
| EP | 1 475 360 A1 | 10/2004 |
| IT | 2000MI0343 | 8/2001 |
| JP | 08283663 | 10/1996 |
| RU | 2151151 | 6/2000 |
| WO | WO9845380 | 10/1998 |
| WO | WO00005183 | 2/2000 |
| WO | WO-01/36526 A1 * | 5/2001 |
| WO | WO 01/36526 A1 | 5/2001 |
| WO | WO0187801 | 11/2001 |
| WO | WO01090267 | 11/2001 |
| WO | WO0204383 | 1/2002 |
| WO | WO0214443 | 2/2002 |

OTHER PUBLICATIONS

Taking Care of Marble, Sunset, May 1978, vol. 178, pp. 160-161.
Fisher, T., Getting the Dirt on Masonry, Progressive Architecture 11:83, 1983, vol. 64, pp. 127-131.
Alessandrini, G. et al., Comparative Evaluation of Fluorinated and Unfluorinated Acrylic Copolymers as Water-Repellent Coating Materials for Stone, Journal of Applied Polymer Science, 2000, vol. 76, pp. 962-977, John Wiley & Sons, Inc.
Zielecka, M., Antigraffiti Protection of Porous Building Materials, $25_{th}$ FATIPEC Congress, 2000, vol. 2, pp. 310-319.
Castelvetro, V. et al., Structure Control, Coating Properties, and Durability of Fluorinated Acrylic-Based Polymers, J. Coatings Tech, May 2002, vol. 74, No. 928, pp. 57-66.
Guasch, Michael, et al., Granite, Limestone and Marble—Part I: Structural and Chemical Effects on Water Absorption, Stone World Buyers Guide 2003, vol. 19, pp. 58-67.
Benedetti, E., et al., Characterization of Acrylic Resins and Fluoroelastomer Blends as Potential materials in Stone Protection, Polymer International, Society of Chemical Industry, *Polym Int* 49:888-892 (2000).

* cited by examiner

*Primary Examiner*—Peter D. Mulcahy
*Assistant Examiner*—Henry Hu
(74) *Attorney, Agent, or Firm*—Nancy S. Mayer

(57) ABSTRACT

A composition comprising a mixture, having a maximum molar ratio of acid to base of 0.6 and providing water repellency when applied to a substrate surface without etching of said surface, of A) an anionic aqueous fluoroalkyl phosphate solution which provides at least about 75% of the total fluorine content of said composition, and B) a cationic copolymer of fluoroalkyl(meth)acrylate or perfluoroalkylether(meth)acrylate present at a minimum of 0.3 g per 100 g of said composition.

9 Claims, No Drawings

ANIONIC/CATIONIC MASONRY SEALING SYSTEMS

FIELD OF THE INVENTION

The present invention relates to treatment systems for hard surfaced materials which provide repellency without etching of the surface of the material.

BACKGROUND OF THE INVENTION

Stone, masonry, concrete, unglazed tile, brick, porous clay and various other substrates with surface porosity are used decoratively in the indoor and exterior environment. However, oils, hydraulic fluids, and oily and aqueous foodstuffs, including, for instance, oils, coffee, ketchup, salad dressings, mustard, red wine, other beverages, and fruit preserves easily stain such surfaces. Many of the prior art treatments, such as clear sealants based on polyurethanes or epoxies, disadvantageously alter the appearance of the substrate. Such sealants can also trap moisture within the treated substrate, promoting spalling.

Longoria, et al. in U.S. Pat. No. 6,271,289, describe a composition providing stain resistance to stone, masonry and other surfaces comprising a mixture of anionic fluoroalkyl phosphates and anionic fluoroacrylate polymers.

Fluorochemical copolymers, typically as aqueous dispersions, are used to impart water resistance and oil and grease repellency to paper and textile fibers as well as to calcitic and/or siliceous architectural and construction materials. Conventional commercial dispersions and dispersions having a low pH tend to etch marble and other calciferous substrates.

It is desirable to have compositions wherein the anionic phosphate can be combined with cationic polymers that provide superior oil and water repellency, stain resistance, and improved compatibility with substrate surfaces such as marble and limestone that are calcium carbonate compositions and thus susceptible to etching. The present invention provides such a composition.

SUMMARY OF THE INVENTION

The present invention comprises a composition comprising an aqueous first mixture, having a maximum molar ratio of acid to base of 0.6 and providing water repellency when applied to a substrate surface without etching of said surface, of A. an anionic aqueous fluoroalkyl phosphate solution which provides at least about 75% of the total fluorine content of said first mixture comprising 1) a second mixture of Formula IA of mono(perfluoroalkyl)phosphate and bis(perfluoroalkyl)phosphate, $$[R_f\text{—}(O)_j]_x\text{—}P(O)\text{—}O^-X^+)_{(3-x)} \quad \text{Formula 1A}$$

wherein:

$R_f$ is selected from the group consisting of
$F(CF_2CF_2)_d(CH_2)_a$—,
$F(CF_2CF_2)_dCH_2CH_2(OCH_2CH_2)_b$—,
$F(CF_2CF_2)_d$—,
$F(CF_2CF_2)_dCH$=$CH(CH_2)_c$—, and
$C_8F_{17}SO_2N(R_5)CH_2CH_2$—;
a is from about 2 to about 10,
b is from about 3 to about 20,
c is from about 2 to about 20,
d is 1 to about 8, or a mixture thereof,
$R_5$ is H or an aliphatic group containing 1 to about 4 carbon atoms,
x is from about 1 to about 2,
j is 1 or 0, or a mixture thereof, and
X is hydrogen or M,
M is an ammonium ion, an alkali metal ion, or an alkanolammonium ion, or 2) a phosphate of the structure of Formula IB

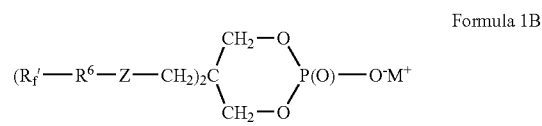

Formula 1B wherein $R_f'$ is a fluoroaliphatic group having a linear or branched perfluorocarbon chain having from about 2 to about 20 carbon atoms, $R^6$ is an alkylene group having from 1 to about 8 carbon atoms, Z is —O—, —S—, or —NH—, and M is as defined above in Formula IA, and B. a cationic fluoroalkyl(meth)acrylate or perfluoroalkylether(meth)acrylate copolymer present at a minimum of 0.3 g per 100 g of said first mixture, and comprising monomers copolymerized in the following percentages by weight:

(a) from about 40% to about 92% of at least one monomer of formula 2A $$R_f\text{'-Q-A-C(O)—C(R_7)}{=}CH_2 \quad 2A$$

wherein:

$R_f'$ is a fluoroaliphatic group having a linear or branched perfluorocarbon chain having from about 2 to about 20 carbon atoms, $R_7$ is H or an aliphatic group containing 1 to about 4 carbon atoms, A is O, S or $NR^1$ wherein $R^1$ is H or an alkyl of 1 to about 4 carbon atoms, and Q is alkylene of 1 to about 15 carbon atoms, hydroxyalkylene of 3 to about 15 carbon atoms, —$(C_nH_{2n})(OC_qH_{2q})_m$—, —$SO_2$—$NR^1(C_nH_{2n})$—, or —$CONR^1(C_nH_{2n})$—, wherein $R^1$ is H or alkyl of 1 to about 4 carbon atoms, n is 1 to about 15, q is 2 to about 4, and m is 1 to about 15; and R is hydrogen or a C1 to about C2 alkyl group, (b) from about 1% to about 50% of a monomer of formula 2B $$(CH_2{=}C(R_7)COW(CH_2)_r{}^+NR^2R^3R^4)Y^- \quad 2B$$

wherein $R_7$ is H or an aliphatic group containing 1 to about 4 carbon atoms, $R^2$ and $R^3$ are each independently alkyl of 1 to about 4 carbon atoms, hydroxyethyl, or benzyl or $R^2$ and $R^3$ together with the nitrogen atom form a morpholine, pyrrolidine, or piperidine ring, $R^4$ is H or alkyl of 1 to about 4 carbon atoms or $R^2$, $R^3$, and $R^4$ together with the nitrogen form a piperidine ring, W is —O— or —$NR^4$— r is 2 to 4, and $Y^-$ is an anion, provided that the nitrogen is from about 40% to 100% quaternized; and (c) from 0% to about 20% of an anionic monomer or a monomer which is potentially anionic by varying the pH;

(d) from about 0% to about 10% of a vinyl derivative of formula 2C $$R_8-CH=CH_2 \quad \quad 2C$$

wherein $R_8$ is an alkyl carboxylate or alkyl ether group containing from 1 to about 18 carbon atoms; and (e) from 0 to about 25% of at least one monomer of formula 2D $$CH_2=C(R_9)-C(O)-O-V-OH \quad \quad 2D$$

wherein $R_9$ is H or an alkyl of 1 to about 4 carbon atoms, and

V is an alkylene of from about 2 to about 4 carbon atoms; and (f) from 0 to about 30% of any monomer other than the monomers of components (a) to (e) described above;

provided that the weight percents for components (a) to (f) described above total 100%.

The present invention further comprises a process for the preparation of a composition of claim 1 comprising 1) addition of water to a dispersion of the cationic copolymer of component B and mixing to yield a diluted copolymer, 2) addition of the anionic fluoroalkyl phosphate solution of component A to the diluted copolymer of component B, and 3) mixing or homogenizing.

The present invention further comprises a method of treating a substrate-comprising application to the surface of the substrate of a composition as defined above, and the substrate so treated.

DETAILED DESCRIPTION

Herein, trademarks are shown in upper case.

The term "(meth)acrylate", as used herein, indicates either acrylate or methacrylate.

The term "substrate surfaces", as used herein, includes porous mineral surfaces, such as stone, masonry, concrete, unglazed tile, brick, porous clay and various other substrates with surface porosity. Specific examples of such substrates include unglazed concrete, brick, tile, stone (including granite and limestone), grout, mortar, marble, limestone, statuary, monuments, wood composite materials such as terrazzo, and wall and ceiling panels including those fabricated with gypsum board. These are used in the construction of buildings, roads, parking ramps, driveways, floorings, fireplaces, fireplace hearths, counter tops, and other decorative uses in interior and exterior applications.

The present invention comprises fluorinated aqueous mixtures comprising a mixture of (1), an anionic aqueous fluoroalkyl phosphate solution neutralized with a dialkanolamine base and (2), a cationic copolymer of fluoroalkyl(meth)acrylate or perfluoroalkylether(meth)acrylate, preferably in the form of an aqueous dispersion.

The composition comprises a mixture, having a maximum molar ratio of acid to base of 0.6 and providing water repellency when applied to a substrate surface without etching of said surface, of A) an anionic aqueous fluoroalkyl phosphate solution which provides at least about 75% of the total fluorine content of said composition, and B) a cationic copolymer of fluoroalkyl(meth)acrylate or perfluoroalkylether(meth) acrylate present at a minimum of 0.3 g per 100 g of said composition.

The mixtures of the present invention, when applied to substrate surfaces, provide oil and water repellency, and improved compatibility with substrate surfaces susceptible to etching, such as marble and limestone, particularly when polished. Both the specific solution and dispersion components and the ratios of components are varied to enhance desired performance attributes of the mixtures of the present invention for specific substrate surfaces. For instance, suppression of etching is desirable for a polished marble statue, but repellency may be more important for an unglazed ceramic tile.

The present invention further comprises the process of preparing the aqueous mixtures and for treating the substrate surfaces with the aqueous mixtures of this invention. The present invention also comprises substrate surfaces treated with the aqueous mixtures of this invention.

The present invention is an aqueous composition comprising a first mixture, having a maximum molar ratio of acid to base of 0.6 and providing water repellency when applied to a substrate surface without etching of said surface, of A. an anionic aqueous fluoroalkyl phosphate solution which provides at least about 75% of the total fluorine content of said first mixture comprising 1) a second mixture of Formula IA of mono(perfluoroalkyl)phosphate and bis(perfluoroalkyl)phosphate, $$[R_f-(O)_j]_x-P(O)-O^-X^+_{(3-x)} \quad \quad \text{Formula 1A}$$

wherein:

$R_f$ is selected from the group consisting of
$F(CF_2CF_2)_a(CH_2)_a-$,
$F(CF_2CF_2)_aCH_2CH_2(OCH_2CH_2)_b-$,
$F(CF_2CF_2)_d-$,
$F(CF_2CF_2)_aCH=CH(CH_2)_c-$, and
$C_8F_{17}SO_2N(R_5)CH_2CH_2-$;

a is from about 2 to about 10, and preferably is 2 b is from about 3 to about 20, and preferably is from about 6 to about 13, c is from about 2 to about 20, and preferably is 8 d is 1 to about 8, or a mixture thereof, and preferably is from about 3 to about 6, $R_5$ is H or an aliphatic group containing 1 to about 4 carbon atoms, x is from about 1 to about 2, j is 1 or 0, or a mixture thereof, and X is hydrogen or M, M is an ammonium ion, an alkali metal ion, or an alkanolammonium ion, such as ethanolammonium or diethanolammonium, and is preferably ammonium, or 2) a phosphate of the structure of Formula IB

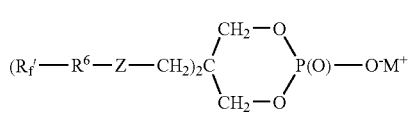

Formula 1B wherein $R_f'$ is a fluoroaliphatic group having a linear or branched perfluorocarbon chain having from about 2 to about 20 carbon atoms, $R^6$ is an alkylene group having from 1 to about 8 carbon atoms, Z is —O—, —S—, or —NH—, and M is as defined above in Formula IA, and B. a cationic fluoroalkyl(meth)acrylate or perfluoroalkylether(meth)acrylate copolymer present at a minimum of 0.3 g per 100 g of said first mixture, and comprising monomers copolymerized in the following percentages by weight:

(a) from about 40% to about 92% of at least one monomer of formula 2A

$R_f'$-Q-A-C(O)—C($R_7$)=CH$_2$       2A wherein:
$R_f'$ is a fluoroaliphatic group having a linear or branched perfluorocarbon chain having from about 2 to about 20 carbon atoms,
$R_7$ is H or an aliphatic group containing 1 to about 4 carbon atoms.
A is O, S or NR$^1$ wherein R$^1$ is H or an alkyl of 1 to about 4 carbon atoms, and
Q is alkylene of 1 to about 15 carbon atoms, hydroxyalkylene of 3 to about 15 carbon atoms, —(C$_n$H$_{2n}$)(OC$_q$H$_{2q}$)$_m$—, —SO$_2$—NR$^1$(C$_n$H$_{2n}$)—, or —CONR$^1$(C$_n$H$_{2n}$)—, wherein R$^1$ is H or alkyl of 1 to about 4 carbon atoms, n is 1 to about 15, q is 2 to about 4, and m is 1 to about 15; and (b) from about 1% to about 50% of a monomer of formula 2B

(CH$_2$=C(R$_7$)COW(CH$_2$)$_r$$^+$NR$^2$R$^3$R$^4$)Y$^-$       2B wherein
$R_7$ is H or an aliphatic group containing 1 to about 4 carbon atoms, preferably alkyl, more preferably CH$_3$,
R$^2$ and R$^3$ are each independently alkyl of 1 to about 4 carbon atoms, hydroxyethyl, or benzyl or R$^2$ and R$^3$ together with the nitrogen atom form a morpholine, pyrrolidine, or piperidine ring,
R$^4$ is H or alkyl of 1 to about 4 carbon atoms or R$^2$, R$^3$, and R$^4$ together with the nitrogen form a piperidine ring,
W is —O— or —NR$^4$—
r is 2 to 4, and
Y$^-$ is an anion, provided that the nitrogen is from about 40% to 100% quaternized;

(c) from 0% to about 20% of an anionic monomer or a monomer which is potentially anionic by varying the pH; such as alkene carboxylic acids (for example, (meth)acrylic acid), monoolefinic derivatives of sulfonic acid (for example acrylamidomethyl propane sulfonic acid), and their salts of alkali or alkaline-earth metals;

(d) from about 0% to about 10% of a vinyl derivative of formula 2C

R$_8$—CH=CH$_2$       2C wherein
R$_8$ is an alkyl carboxylate or alkyl ether group containing from 1 to about 18 carbon atoms;

(e) from 0 to about 25% of at least one monomer of formula 2D

CH$_2$=C(R$_9$)—C(O)—O—V—OH       2D wherein
R$_9$ is H or an alkyl of 1 to about 4 carbon atoms, and
V is an alkylene of from about 2 to about 4 carbon atoms; and (f) from 0 to about 30% of any monomer other than the monomers of components (a) to (e) described above;

provided that the weight percents for components (a) to (f) described above total 100%.

The fluoroalkylphosphates of component A of the composition of the present invention are prepared according to the method described by Longoria et al in U.S. Pat. No. 6,271,289, and Brace and Mackenzie, in U.S. Pat. No. 3,083,224 each herein incorporated by reference. Typically, either phosphorus pentoxide (P$_2$O$_5$) or phosphorus oxychloride (POCl$_3$) are reacted with the fluoroalcohols to give mixtures of the mono- and bis(perfluoroalkyl)phosphoric acids. Neutralization, using common bases such as ammonium or sodium hydroxides provides the corresponding phosphates. Reacting an excess of fluoroalcohol with P$_2$O$_5$ followed by neutralization provides an equimolar mixture of mono(perfluoroalkyl) phosphate and bis(perfluoroalkyl)phosphate. Higher ratios of bis(perfluoroalkyl)phosphate to mono(perfluoroalkyl)phosphate are obtained by using the method of Hayashi and Kawakami in U.S. Pat. No. 4,145,382.

An example of a compound of Formula 1A is the reaction product formed from the partial esterification of a fluoroalcohol mixture of perfluoroalkylethyl alcohols and phosphoric acid that is largely, but not completely, in the form of the diethanolamine salt and having the formula:

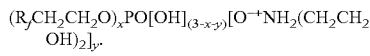
(R$_f$CH$_2$CH$_2$O)$_x$PO[OH]$_{(3-x-y)}$[O$^-$$^+$NH$_2$(CH$_2$CH$_2$OH)$_2$]$_y$.

The various molar ratios of the fluoroalcohol, phosphoric acid, and diethanolamine are identified by the format (x:1:y), thus the (2:1:1) salt is the bis(perfluoroalkylethyl) phosphate diethanolamine salt, the (1:1:2) salt is the perfluoroalkylethyl phosphate bis(diethanolamine salt) and the (1:1:1) salt is the perfluoroalkylethyl phosphate diethanolamine salt. The salts of the fluoroalkylphosphates are preferred over the corresponding acids by reason of their increased water solubility.

The cationic copolymers of component B of the composition of the present invention are prepared using various methods, generally, by polymerization of a monomer mixture. The copolymers are prepared by copolymerization of the monomers in solution in a distillable organic solvent. The term "distillable" solvent is understood to mean any organic solvent or solvent mixture whose boiling point at atmospheric pressure is less than 150° C. Next, the reaction mixture is diluted with water in the presence of a mineral or organic acid in order to quaternize the macromolecules. According to one variant in the preparation of these copolymers, this dilution step is carried out in the presence of hydrogen peroxide or is followed by a treatment by means of an aqueous hydrogen peroxide solution.

Preferably in the fluoromonomer, $R_f$ is a straight chain perfluoroalkyl group of 2 to about 20 carbon atoms, A is O, and Q is an alkylene of 1 to about 15 carbon atoms. Suitable monomers include

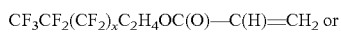
CF$_3$CF$_2$(CF$_2$)$_x$C$_2$H$_4$OC(O)—C(H)=CH$_2$ or

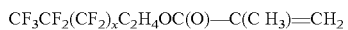
CF$_3$CF$_2$(CF$_2$)$_x$C$_2$H$_4$OC(O)—C(CH$_3$)=CH$_2$ wherein x is an even integer of from 2 to about 18, or mixtures thereof. More preferably the fluoromonomer is a perfluoroalkylethyl acrylate or methacrylate, with a perfluorocarbon chain length ($R_f$) distribution predominantly in the range of 8 to 14 carbons.

The most preferred perfluoroaliphatic monomer of formula 2A is that wherein $R_7$ is CH$_3$, and $R_f$ is a mixture of perfluoroalkyl groups, CF$_3$CF$_2$(CF$_2$)$_s$—, wherein s is 2, 4, 6, 8, 10 and 12 in the approximate weight percent of 2, 35, 30, 18, 8, 3 respectively. Such a monomer has a weight average molecular weight of about 522. The corresponding acrylate monomer has a weight average molecular weight of about 508.

For these cationic copolymers, one preferred embodiment is to polymerize:

(a) the compounds of formula:

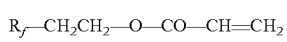
R$_f$—CH$_2$CH$_2$—O—CO—CH=CH$_2$ wherein $R_f$ is a perfluoroalkyl radical containing from about 4 to about 20 carbon atoms;

(b) dialkylaminoalkyl acrylate or a dialkylaminoalkyl methacrylate, or corresponding acrylamide or methacrylamide, as either the amine or quaternary ammonium salt.

(c) methacrylic acid as monomer; and (d) vinyl acetate.

The fluoromonomers of formula 2A are prepared according to known processes, for example by esterification of the corresponding polyfluoro alcohols of formula $$R_f\text{—}X\text{—}OH$$

using an alkenecarboxylic acid of formula $$HO\text{—}CO\text{—}CR\text{=}CH\text{—}R$$

such as, for example, acrylic acid, methacrylic acid or crotonic acid, in the presence of a catalyst such as sulfuric acid or p-toluenesulfonic acid. Instead of the alkenecarboxylic acids, the esters, anhydrides or halides thereof are also suitable for use. Examples of polyfluoro alcohols include, in particular those below:

$$R_f\text{—}(CH_2)_p\text{—}SO_2NR\text{—}(CH_2)_q\text{—}OH$$

$$R_f\text{—}SO_2NR\text{—}(CH_2)_q\text{—}OH$$

$$R_f\text{—}(CH_2)_p\text{—}OH$$

$$R_f\text{—}(CH_2)_p\text{—}O\text{—}(CH_2)_q\text{—}OH$$

$$R_f\text{—}(CH_2)_p\text{—}S\text{—}(CH_2)_q\text{—}OH$$

$$R_f\text{—}(CH_2)_p\text{—}(O\text{—}CH_2CH_2)_q\text{—}OH$$

$$R_f\text{—}(CH_2)_p\text{—}SO_2\text{—}(CH_2)_q\text{—}OH$$

$$R_f\text{—}CO\text{—}NR\text{—}(CH_2)_p\text{—}OH$$

$$R_f\text{—}CO\text{—}O\text{—}(CH_2)_p\text{—}OH$$

$$R_f\text{—}CH\text{=}CH\text{—}(CH_2)_p\text{—}OH$$

in which $R_f$ and R have the same meanings as above, and the symbols p and q, which are identical or different, each represent an integer ranging from 1 to 20 and, preferably, equal to 2 or 4. Alternatively, the fluoromonomers of formula 2A are prepared by tranesterification with methyl acrylate or methyl methacrylate, for example, as described in U.S. Pat. No. 3,282,905.

Examples of monomers of formula 2A are the acrylates and methacrylates of the following amino alcohols: 2-dimethylaminoethanol, 2-diethylaminoethanol, 2-dipropylaminoethanol, 2-diisobutylaminoethanol, 2-N-tert-butylaminoethanol, 2-(N-tert-butyl-N-methylamino)ethanol, 2-morpholinoethanol, 2-(N-methyl-N-dodecylamino)ethanol, 2-(N-ethyl-N-octadecylamino)ethanol, 2-[N-ethyl-N-(2-ethylhexyl)amino]ethanol, 2-piperidinoethanol, 2-(1-pyrrolidinyl)ethanol, 3-diethylamino-1-propanol, 2-diethylamino-1-propanol, 1-dimethylamino-2-propanol, 4-diethylamino-1-butanol, 4-diisobutylamino-1-butanol, 1-dimethylamino-2-butanol, 4-diethylamino-2-butanol. These esters may be prepared, for example, according to the method described in U.S. Pat. No. 2,138,763. The preferred monomer of formula E4.2 is dimethylaminoethyl methacrylate or N-tert-butylaminoethyl methacrylate.

The preferred monomer of the structure of formula 2B is a dialkylaminoalkyl acrylate or a dialkylaminoalkyl methacrylate, or corresponding acrylamide or methacrylamide, as either the amine or quaternary ammonium salt. Mixtures of the various salt forms are also operable herein. A preferred amine salt monomer is:

$$CH_2\text{=}C(R_7)CO_2CH_2CH_2N^+H(C_2H_5)_2Y^-$$

Preferred quaternary ammonium monomers are:

$$CH_2\text{=}C(R_7)CO_2CH_2CH_2N^+(CH_3)(C_2H_5)_2Y^- \text{ and}$$

$$CH_2\text{=}C(R_7)CONHCH_2CH_2CH_2N^+(CH_3)_3Y^-$$

Preferably the quaternizable monomer of formula 2B is at least 40% quaternized for adequate solubilizing effect, but may be as high as 100% in this form. The quaternization is performed on the copolymer containing the free amine, or is carried out on the amine group before polymerization with equally good results.

The copolymer is quaternized using strong or moderately strong inorganic or organic acids, acids whose dissociation constant or whose first dissociation constant is greater than $10^{-5}$. These include hydrochloric acid, hydrobromic acid, sulfuric acid, nitric acid, phosphoric acid, acetic acid, formic acid, propionic acid or lactic acid. Acetic acid is preferably used. The copolymer is quaternized using suitable agents such as an acetate, halide, sulfate or other known quaternizing groups. Examples include methyl iodide, ethyl iodide, dimethyl sulfate, diethyl sulfate, benzyl chloride, trimethyl phosphate or methyl p-toluenesulfonate.

The amine salt monomers are prepared by reacting the corresponding tertiary dialkylaminoalkyl acrylate or dialkylaminoalkyl methacrylate ester or corresponding acrylamide or methacrylamide with an organic or inorganic acid, such as hydrochloric, hydrobromic, sulfuric or acetic acid. The tertiary dialkylaminoalkyl acrylate or dialkylaminoalkyl methacrylate esters are known in the art and can be prepared by either reacting a tertiary amine alcohol of the formula, $HO(CH_2)_r NR^2R^3$, wherein r is 2 to 4, with acryloyl or methacryloyl halide or, preferably, by transesterification with methyl acrylate or methyl methacrylate.

The tertiary dialkylaminoalkyl acrylamides or methacrylamides are prepared by acylating the corresponding dialkylaminoalkyl amine with acryloyl or methacryloyl halide in the presence of an acid acceptor such as triethylamine or pyridine.

The quaternary ammonium monomers are prepared by reacting the aforesaid acrylate or methacrylate esters or corresponding acrylamide or methacrylamide with a di-(lower alkyl) sulfate, a lower alkyl halide, trimethylphosphate or triethylphosphate. Dimethyl sulfate and diethyl sulfate are preferred quaternizing agents.

The nature of the anion, $Y^-$, in the quaternary ammonium and amine salt monomer is, in general, determined by the method of synthesis. Usually, $Y^-$ is a halide ion, such as chloride, bromide, or iodide, or an acetate ion, sulfate ion, phosphate ion, or an alkylsulfate ion. It is known, however, that quaternary ammonium salts can also be prepared by reacting a tertiary amine with an alkyl ester of benzene or toluenesulfonic acid; in such event, $Y^-$ is a benzenesulfonate or toluenesulfonate anion.

The copolymers of component B of the composition of the present invention are obtained by polymerizing the monomers by conventional solvent polymerization techniques. Any of the conventional neutral solvents such as ethyl acetate, acetone, 1,2-dichlorotetrafluoroethane, 1,1,2-trichloro-1,2,2-trifluoroethane, tetrahydrofuran, dioxane, dimethylformamide, N-methyl-2-pyrrolidone, dimethyl sulfoxide, ethyl acetate, isopropyl acetate, butyl acetate, methylethylketone, ethanol, isopropanol, methylisobutylketone, or other ketones, esters and alcohols and mixtures thereof can be used. As polymerization solvent, it is preferred to use isopropanol, N-methyl-2-pyrrolidone (NMP), acetone or an NMP/acetone binary mixture. The total concentration of monomers may range from 5 to 60% by weight. The copolymer solutions can be diluted, if desired, with polymerization solvent and/or water. Alternatively, the copolymers can be isolated by removal of solvent. After polymerization, the above solvent can be retained in the final composition if required for an intended application, or it can be removed by distillation to form a waterborne composition with a very low volatile organic content. A dispersion of the composition is prepared using conventional means known to those skilled in the art.

The polymerization is carried out in the presence of one or more initiators which are used to a proportion of 0.1 to 1.5% relative to the total weight of monomers employed. Initiators which may be used are peroxides such as, for example, benzoyl peroxide, lauroyl peroxide, succinyl peroxide and tert-butyl perpivalate, or azo compounds such as 2,2'-azobisisobutyronitrile, 4,4'-azobis(4-cyanopentanoic acid) and azodicarbonamide. Such Azo initiators are sold by E. I. du Pont de Nemours and Company, Wilmington, Del., commercially under the name of "VAZO" 67, 52 and 64, and by Wako Pure Industries, Ltd., under the name "V-501". The process may also be performed in the presence of UV radiation and photo-initiators such as benzophenone, 2-methylanthraquinone or 2-chlorothioxanthone.

Conventional chain transfer agents, such as allyl mercaptans (preferably dodecylmercaptan), carbon tetrachloride, triphenylmethane, isooctyl thioglycolate, and crosslinking agents, such as ethylene dimethacrylate, can be used in amounts of 0.1 to 2 percent by weight of the monomers to control the molecular weight of the polymer.

The reaction temperature varies within a wide range, that is to say between room temperature and the boiling point of the reaction mixture. The process is preferably performed between about 60° and about 90° C.

The composition of the copolymers is preferably in the form of a dispersion. It is typically employed as an aqueous dispersion.

Other monomers may optionally be incorporated into the copolymers to provide adhesion to specific substrate surfaces, impart film formation properties, provide stability at wider pH ranges, or provide compatibility with added solvents for specific applications. This optional monomer is any polymerizable monomer described above as components (c), (d) or (e). Up to about 20%, and preferably from 1 to about 10%, of an anionic monomer or a monomer which is potentially anionic by varying the pH may be optionally incorporated. Such monomers include alkene carboxylic acids (for example, (meth)acrylic acid), monoolefinic derivatives of sulfonic acid (for example acrylamidomethyl propane sulfonic acid), and their salts of alkali or alkaline-earth metals. Up to about 10% of a vinyl derivative of formula 2C, and up to about 25% of a monomer of formula 2D, may also be incorporated into the copolymers. Examples of such include crosslinkable monomers such as glycidyl(meth)acrylate, (blocked) isocyanatoalkyl-(meth)acrylates, and acrylamides, vinyl monomers such as vinylidene chloride, alkyl(meth) acrylates such as ethylhexyl methacrylate and stearyl methacrylate, ionomers such as (meth)acrylic acid and sulfatoalkyl(meth)acrylates, nonionic water-soluble monomers such as polyoxyethylene(meth)acrylates, and aromatics such as styrene and vinyl toluene.

The compositions of the present invention, the components of which are defined above, are now further defined in terms of their concentration ranges. The composition of the present invention ready for application to the substrate surface, comprises a mixture of at least one anionic fluorophosphate and at least one cationic fluorocopolymer. The compositions are based on a total weight of 100 g, including water. Water, in an amount sufficient to provide the desired water content of the final mixture, is added to the cationic copolymer and mixed thoroughly. The fluoroalkyl phosphate is then added to the mixture of water and cationic copolymer and stirred or homogenized. The percent anionic fluoroalkyl phosphate component by weight in the mixture of the present invention is from about 0.1% to about 65%, and preferably from about 3.5% to about 62%, and most preferably from about 11.8% to about 25.7%. The percent cationic copolymer component by weight in the mixture of the present invention is from about 0.1% to about 51%, and preferably from about 0.3% to about 16%, and most preferably from about 2.4% to about 7.1%. Water is present at 35% to 98.5% such that the combined amounts of the three components add to 100%.

Anionic fluorophosphates alone provide no significant water repellency. Their pH (7-9) does not cause the etching of substrate surfaces containing calcium carbonate, such as marble. Conversely, the cationic polymers provide water repellency but their lower pH (3.5-5.5) does induce etching of such substrate surfaces. Thus, the two components must be blended to give a mixture with adequate stability which, (a) contains enough cationic fluoropolymer copolymer to provide water repellency, and (b) contains enough anionic fluorophosphate to suppress the etching properties of the cationic fluoropolymer copolymer. Requirement (b) is conveniently measured in terms of the percent total fluorine contributed by the anionic fluorophosphate.

Thus, the compositions of the present invention require (i) a minimum weight of the fluorinated copolymer, namely about 0.3 g/100 g composition, preferably 0.5 g/100 g composition, and more preferably 0.7 g/100 g composition; (ii) a minimum contribution of the total fluorine originating in the fluorophosphate component, namely about 10% or more, preferably 80% or more, and more preferably 85% or more; and (iii) a maximum ratio of the moles of acid (e.g., acetic acid) contributed by the copolymer to the moles base (e.g., diethanolamine or ammonium hydroxide) contributed by the fluorophosphate. This acid/base ratio is not greater than about 0.6, preferably not greater than about 0.5, more preferably not greater than about 0.4. The three requirements sequentially provide (i) a minimum level of copolymer to provide water repellency, (ii) a preponderance of the total fluorine content contributed by the fluorophosphate, and (iii) a sufficient excess of base, contributed by the fluorophosphate, to counteract the acetic acid contributed by the copolymer, thus suppressing surface etching of the treated substrate. The method for calculating the acid/base ratio is described below in Test Method 4.

The percent total fluorine in the mixture of the present invention, a mixture of anionic fluoroalkyl phosphate and cationic fluoroalkyl(meth)acrylate or fluoroalkyether(meth) acrylate copolymer) is from about 0.25% to about 7.5% by weight, preferably from about 1% to about 6.8% by weight, and most preferably from about 2.5% to about 6.5% by weight. Above about 7% fluorine content in the mixture of the present invention, the formulation cost increases with less added benefit in terms of stain resistance or repellency, and, in certain formulations, the stain resistance property may even decrease.

Increasing the percent total fluorine in the composition typically increases the stain resistance of substrates treated with the compositions of the present invention. Example 10

(stain resist score 13, 2.86% F) and Example 7 (stain resist score 19, 0.84% F), for instance, have the same components, but Example 7 has a lower total percent fluorine and less effective stain resistance. In applications where stain resistance is of greater importance, component concentrations are adjusted to increase the total fluorine content to meet this requirement.

The present invention further comprises a process for the preparation of the above-described composition of the present invention. Since the composition of the present invention is a mixture of an anionic solution and a cationic dispersion, care is necessary in the preparation process to avoid coagulation or irreversible precipitation during the mixing stage. The addition of the fluoro(meth)acrylate polymer dispersion to the fluoroalkyl phosphate solution is prone to cause coagulation and is not recommended. Water, in an amount sufficient to provide the desired water content of the final mixture, is added to the cationic copolymer and mixed thoroughly. The amount of water added per 100 g of composition of the present invention is equal to 100 minus the total weight in g of components A and B. Addition of the anionic fluoroalkyl phosphate solution to the water-diluted cationic fluoro(meth)acrylate polymer dispersion is recommended to minimize coagulation. The mixture is conducted at ambient temperature and pressure. Ideally, the components are mixed in the above order and then passed though a homogenizer. Where a homogenizer is used, samples are preferably homogenized at about 4000 psi (27.6 MPa) for 2 passes in an APV Gaulin, Inc. Model 15MR Homogenizer, available from APV Americas, Lake Mills, Wis. At the second pass the temperature of each sample is typically about 38° C. Those skilled in the art will know there are many other equivalent homogenizers that may be substituted. Typically a homogenizer is preferred but not required for preparing smaller volumes, such as laboratory mixtures with volumes of 1 L or less. The mixture is prepared at a ready-to-apply concentration (treating composition), or at a higher concentration for subsequent dilution prior to application.

Optionally, the mixture of the present invention may further comprise up to 10% by weight but preferably not more than 3% by weight of one or more water-miscible organic solvents such as alcohols, ketones and esters to improve penetration, drying and the stability of the emulsion. Examples include ethanol, methylisobutylketone and isopropyllactate. Organic solvents in the mixtures are preferably kept at a minimum for health, safety, pollution, and ecological reasons.

The mixture of the present invention also optionally further comprises conventional additives which are compatible with the mixture in aqueous solution or self-dispersed emulsion or dispersion form. In particular, the mixture additionally contains a microbicide. Suitable microbicides are well known to those skilled in the art. A preferred microbicide is PROXEL GXL from Avecia, Inc., Wilmington Del.

The present invention further comprises a method of treating a substrate surface to provide oil and water repellency to the substrate without etching the substrate surface comprising application of the composition of the present invention described above to the substrate surface. The composition of the present invention, at an application concentration containing total fluorine as described above, is applied to the substrate surface by conventional means, including but not limited to, brush, spray, roller, doctor blade, wipe, and dip techniques, preferably using a first coating, followed by at least one additional coat using a wet-on-wet technique. More porous substrates may require subsequent additional coats. The wet-on-wet procedure comprises applying a first coat which is allowed to soak into the substrate but not dry (e.g., for about 10-30 minutes) and then applying a second coat. Any subsequent coats are applied using the same technique as described for the second coat. The substrate surface is then allowed to dry under ambient conditions, or the drying can be accelerated by warm air if desired. The wet-on-wet application procedure provides a means to distribute or build up more of the protective coating at the substrate surface. A wet-on-wet application is preferred since, if the previous coat is allowed to dry, it tends to repel subsequent coats. For porous substrates, the coats should saturate the substrate surface.

The present invention further comprises substrates treated according to the method of the present invention. These substrates comprise porous surfaced materials used in interior and exterior construction applications. Especially suitable for use herein are substrates containing calcium carbonate which are susceptible to etching. However, a wide variety of construction substrates are suitable for use herein. Examples of such materials include unglazed concrete, brick, tile, stone (including granite and limestone), grout, mortar, composite materials such as terrazzo, wall and ceiling panels including those fabricated with gypsum board, marble, statuary, monuments, and wood. The treated substrates have improved repellency for water, oil and greases and provide protection against water- and oil-borne staining.

The compositions, method, and treated substrates of the present invention are useful in providing water repellency without etching of the surface for a variety of hard surfaces used for interior and exterior construction and decorative purposes. Total fluorine content can be adjusted to also provide stain resistance. Substrates having surface porosity are especially subject to staining and often difficult to protect without altering the appearance of the surface. The present invention provides protection while maintaining vapor permeability and the original appearance of the surface. Additionally, the mixtures of the present invention do not etch calciferous substrates such as marble and limestone, particularly when polished.

Materials

The following commercial fluorophosphates and fluorocopolymers were used in the Examples and Comparative Examples.

TABLE 1

| Component Code* | |
|---|---|
| *Aqueous Anionic Fluorophosphates* | |
| Q1 | Solution of mixed perfluoroalkylethyl phosphate diethanolamine salts, 16% (1:1:2), 16% (2:1:1), and 2% (1:1:1), in water and isopropanol |
| Q2 | Solution of mixed perfluoroalkylethyl phosphate diethanolamine salts, 16% (1:1:2), 16% (2:1:1), and 2% (1:1:1), in water and isopropanol |
| Q3 | Solution of mixed perfluoroalkylethyl phosphate ammonium salts, 5-9% (1:1:2), 5-9% (2:1:1), 0-2% (1:1:1), 24% ethylene glycol, and 1-3% alkoxypolyethyleneoxyethanol in water |
| *Aqueous Cationic Fluoroacrylate Copolymers* | |
| P1 | Aqueous dispersion of copolymer of perfluoroalkylethylmethacrylate/ diethylaminoethylmethacrylate |
| P2 | Aqueous dispersion of copolymer of perfluoroalkylethylacrylate/ dimethylaminoethylmethacrylate/vinyl acetate |

*Q1-Q3, and P1 and P2 are available from E. I. du Pont de Nemours and Company, Wilmington DE.

Test Methods

Application for Test Methods 1 and 2.

In all Examples, treating solutions were made by diluting the compositions defined in Table 1 and 2 in water to the desired treating concentration as defined in Table 2. A sponge was used to apply the product to three samples of each substrate surface and allowed to dry for five minutes, when the surface was wiped with the same sponge to remove any excess. The samples were allowed to sit for an additional 30 minutes before applying the second coat. The process was repeated until the number of desired coats were applied. Three coats of product were applied to limestone and two coats were applied to granite.

Test Method 1. Determination of Water Repellency

This test method describes the procedure for testing the water repellency. Square tiles (12 in. square [30.5 cm$^2$]) of a sample limestone (Crema Beida) and of granite were cut into 4 in. square (10.2 cm$^2$) samples. After cutting the stone samples were rinsed to remove any dust or dirt and allowed to dry thoroughly, typically 3 days or more. Three tiles were used for each example, and the values averaged. Sample solutions to be tested were prepared and applied to the tiles as described above. After the treated tiles dried overnight, three drops of deionized water were placed on each tile and allowed to sit for 30 seconds. Visual contact angle measurements were used to determine water repellency. The following rating chart was used to determine contact angle using a 1 to 6 scale, as shown below:

Repellency Rating 1 (Excellent): Contact angle 100°-120°.
Repellency Rating 2 (Very good): Contact angle 75°-90°.
Repellency Rating 3 (Good): Contact angle 45°-75°.
Repellency Rating 4 (Fair): Contact angle 25°-45°.
Repellency Rating 5 (Poor): Contact angle 10°-25°.
Repellency Rating 6 (Penetration): Contact angle <10°.

The repellency ratings were averaged to give a composite rating. Lower numbers indicate greater repellency with ratings of 1 to 4 being acceptable.

Test Method 2. Determination of Stain Resistance.

Square tiles (12 in. square [30.5 cm$^2$]) of a sample limestone (Crema Beida) and of granite were cut into 4 in. square (10.2 cm$^2$) samples. After cutting the stone samples were rinsed to remove any dust or dirt and allowed to dry thoroughly, typically 3 days or more. Three tiles were used for each example, and the values averaged. Sample solutions to be tested were prepared and applied to the tiles as described above. After the treated tiles dried overnight, three drops of deionized water were placed on each tile and allowed to sit for five minutes. The following food stains were placed at intervals on the surface of the treated and dried limestone and granite tiles and allowed to remain on the tile for 24 hours: 1) hot bacon grease, 2) cola, 3) black coffee, 4) grape juice, 5) Italian salad dressing, 6) ketchup, 7) lemon juice, 8) mustard, and 9) Wesson oil.

After a 24-hour period, the food stains were blotted or lightly scraped from the tile surface. The tile's surface was rinsed with water and a stiff bristle brush was used to scrub the surface 10 cycles back and forth. The tiles were then rinsed with water and allowed to dry for 24 hours before rating.

The stains remaining on the tile surfaces after cleaning were rated visually according to a scale of 0 to 5 as follows: 0=no stain; 1=very light stain; 2=light stain; 3=moderate stain; 4=heavy stain; and 5=very heavy stain. The ratings for each substrate type are summed for each of the stains to give a composite rating for each type. The maximum total score for one substrate was 9 stains times the maximum score of 5=45. Thus, the maximum for two substrates (granite and limestone) was twice the maximum score of 45=90. Lower scores indicated better stain protection with scores of 20 or less being acceptable and with zero indicating the best protection with no stain present. The summed results are shown in Table 2 below.

Test Method 3: Determination of Etch

Each sample solution was evaluated on polished black marble. Three drops of each test solution were placed on black marble for five, thirty and sixty minutes, respectively. After each test period, the marble was visually rated for etch (gloss change) on a scale of 0 to 3 as follows: 0=no etch; 1=mild etch; 2=moderate etch; and 3=severe etch. Thus, a formulation showing no etch after 5 minutes, mild etch after 30 minutes, and moderate etch after 60 minutes is reported as "0, 1, 2". A "pass" represents a 0,0,0 score. Again, lower numbers indicate less etching. The etching results are shown in Tables 2 (pass/fail).

Test Method 4. pH Measurement

PH values were measured with a Beckman 250 pH Meter (from Beckman Instruments, Inc., Fullerton, Calif.) and used in accordance with the manufacturer's instructions.

EXAMPLES

Component codes for fluoroalkyl phosphates, fluoroalkyl (meth)acrylates, and commercial sealers are listed under MATERIALS in Table 1 above.

Example 1

A penetrating solution was prepared by mixing 1.6 g of the cationic polymer P1 as defined in Tables 1 and 2, with 69.2 g of deionized water. The solution was mixed thoroughly and 28.6 g of the anionic phosphate Q3 as defined in Tables 1 and 2 was added, to yield 100 g penetrating solution. The penetrating solution contained a fluorine concentration of 2.86% fluorine by weight. The solution was applied to substrates as described in Test Method Application above. The substrate samples and untreated controls were stained and tested for water repellency, stain resistance, and etching according to Test Methods 1, 2, and 3, described above. The test results are shown in Table 2. Example 1 did not etch marble, had an acceptable water repellency rating of 3, and an acceptable stain resist rating of 15.

Examples 2-19

Examples 2-19 were prepared and tested as described for Example 1, using the cationic polymer and anionic phosphate in the amounts listed in Table 2. The amount of deionized water used was varied (100 g minus total weight of polymer and phosphate) to yield 100 g of penetrating solution. The fluorine concentration and other characteristics of the penetrating solution are also shown in Table 2. The example solutions were applied to substrates as described in the Test Method Application above, and tested for water repellency, stain resistance, and etching according to Test Methods, 1, 2, and 3 described above. Test results are shown in Table 2. Each of these examples did not etch marble, and had an acceptable water repellency rating of 4 or less. The majority of these examples also had an acceptable stain resist rating of 20 or less.

Comparative Examples A-I

Comparative Examples A-I were prepared and tested as in Examples 1-19 but failed Test Method 1 by having a water repellency rating of greater than 4, and/or failed Test Method 3 by demonstrating marble etching. The test results are shown in Table 2. Examples A through H contained less than 75% F from the phosphate component of the mixture. Example I, although having a high % F from phosphate, contained less than 0.3 g of the copolymer component in the mixture. This data demonstrates the need for a balance of both the copolymer and phosphate components in the mixture.

Comparative Examples AA-GG

Comparative Examples AA-GG contained no fluoroacrylate polymer in the penetrating solution. The quantities of the fluorophosphates are described in Table 1 and were diluted with deionized water to a final penetrating solution weight of 100 g. The calculated percent fluorine all comes from the fluorophosphate. The penetrating solutions were applied to the substrates and tested for water repellency, stain resistance, and etching according to Test Methods 1, 2, and 3. The results are shown in Table 2. Fluorophosphates alone fail the requirements of Test Method 1, water repellency, by having a rating greater than 4.

Comparative Examples HH-MM

Comparative Examples HH-MM contained no fluorophosphates in the penetrating solution. The quantities of the fluoropolymers are described in Table 1 and were diluted with deionized water to a final penetrating solution weight of 100 g. The calculated percent fluorine all comes from the fluoropolymer. The penetrating solutions were applied to the substrates and tested for water repellency, stain resistance, and etching according to Test Methods 1, 2, and 3. The results are shown in Table 2. Fluoropolymers alone fail the requirements of Test Method 3 by demonstrating marble etch.

TABLE 2

| Ex. # | Anionic Fluorophosphate | Phosphate in mix (g) | Cationic Fluoroacrylate Polymer | Polymer in mix (g) | % F from Phosphate | % F in Soln | Water repellency | Marble etch | Total Stain | Mixture Stability |
|---|---|---|---|---|---|---|---|---|---|---|
| Examples | | | | | | | | | | |
| 1 | Q3 (90%) | 28.6 | P1 (10%) | 2.2 | 90 | 2.86 | 3 | Pass | 15 | Very Good |
| 2 | Q3 (90%) | 28.6 | P2 (10%) | 2.4 | 90 | 2.86 | 4 | Pass | 11 | Very Good |
| 3 | Q2 (75%) | 3.7 | P1 (25%) | 1.6 | 75 | 0.84 | 2 | Pass | 13 | Good |
| 4 | Q1 (90%) | 15.1 | P1 (90%) | 2.2 | 90 | 2.86 | 3 | Pass | 19 | Very Good |
| 5 | Q2 (90%) | 15.1 | P1 (90%) | 2.2 | 90 | 2.86 | 3 | Pass | 23 | Very Good |
| 6 | Q1 (75%) | 3.7 | P2 (25%) | 1.7 | 75 | 0.84 | 2 | Pass | 19 | Good |
| 7 | Q2 (75% | 3.7 | P2 (25%) | 1.7 | 75 | 0.84 | 2 | Pass | 19 | Good |
| 8 | Q1 (90%) | 2.6 | P1 (10%) | 0.4 | 90 | 0.5 | 3 | Pass | 27 | Excellent |
| 9 | Q1 (90%) | 15.1 | P2 (10%) | 2.4 | 90 | 2.86 | 3 | Pass | 13 | Very Good |
| 10 | Q2 (90%) | 15.1 | P2 (10%) | 2.4 | 90 | 2.86 | 3 | Pass | 13 | Very Good |
| 11 | Q1 (90%) | 4.4 | P1 (10%) | 0.6 | 90 | 0.84 | 3 | Pass | 16 | Very Good |
| 12 | Q2 (90%) | 4.4 | P1 (10%) | 0.6 | 90 | 0.84 | 3 | Pass | 17 | Very Good |
| 13 | Q1 (90%) | 4.4 | P2 (10%) | 0.7 | 90 | 0.84 | 3 | Pass | 16 | Very Good |
| 14 | Q1 (95%) | 4.7 | P2 (5%) | 0.3 | 95 | 0.84 | 3 | Pass | 17 | Very Good |
| 15 | Q2 (95%) | 4.7 | P1 (5%) | 0.3 | 95 | 0.84 | 3 | Pass | 15 | Very Good |
| 16 | Q1 (95%) | 4.7 | P1 (5%) | 0.3 | 95 | 0.84 | 3 | Pass | 19 | Very Good |
| 17 | Q2 (95%) | 4.7 | P2 (5%) | 0.3 | 95 | 0.84 | 4 | Pass | 27 | Very Good |
| 18 | Q2 (90%) | 4.4 | P2 (10%) | 0.7 | 90 | 0.84 | 4 | Pass | 22 | Very Good |
| 19 | Q1 (75%) | 3.7 | P1 (25%) | 1.6 | 75 | 0.84 | 2 | Pass | 27 | Good |
| Control | None | None | None | None | None | None | 6 | N/A* | 53 | N/A* |
| Comparative Examples, Blends | | | | | | | | | | |
| A | Q1 (10%) | 0.5 | P1 (90%) | 5.8 | 10 | 0.84 | 2 | Fail | 14 | Poor |
| B | Q1 (10%) | 0.5 | P2 (90%) | 6.2 | 10 | 0.84 | 2 | Fail | 24 | Poor |
| C | Q2 (50%) | 2.5 | P1 (50%) | 3.2 | 50 | 0.84 | 2 | Fail | 18 | Fair |
| D | Q2 (50%) | 2.5 | P2 (50%) | 3.5 | 50 | 0.84 | 2 | Fail | 25 | Fair |
| E | Q2 (10%) | 0.5 | P1 (90%) | 5.8 | 10 | 0.84 | 3 | Fail | 16 | Poor |
| F | Q2 (10%) | 0.5 | P2 (90%) | 6.2 | 10 | 0.84 | 4 | Fail | 26 | Poor |
| G | Q1 (50%) | 2.5 | P2 (50%) | 3.5 | 50 | 0.84 | 5 | Fail | 27 | Fair |
| H | Q1 (50%) | 2.5 | P1 (50%) | 3.2 | 50 | 0.84 | 6 | Fail | 44 | Fair |
| I | Q1 (90%) | 1.3 | P1 (10%) | 0.2 | 90 | 0.25 | 6 | Pass | 33 | Excellent |
| Comparative Examples, Single Components, Phosphates | | | | | | | | | | |
| AA | Q3 (100%) | 31.8 | None (0%) | 0 | 100 | 2.86 | 5 | Pass | 14 | Excellent |
| BB | Q2 (100%) | 4.9 | None (0%) | 0 | 100 | 0.84 | 5 | Pass | 16 | Excellent |
| CC | Q1 (100%) | 4.9 | None (0%) | 0 | 100 | 0.84 | 5 | Pass | 21 | Excellent |
| DD | Q1 (100%) | 16.8 | None (0%) | 0 | 100 | 2.86 | 5 | Pass | 19 | Excellent |
| EE | Q1 (100%) | 2.9 | None (0%) | 0 | 100 | 0.5 | 5 | Pass | 24 | Excellent |
| FF | Q2 (100%) | 16.8 | None (0%) | 0 | 100 | 2.86 | 6 | Pass | 25 | Excellent |
| GG | Q1 (100%) | 1.5 | None (0%) | 0 | 100 | 0.25 | 6 | Pass | 26 | Excellent |
| Comparative Examples, Single Components, Polymers | | | | | | | | | | |
| HH | None (0%) | 0 | P1 (100%) | 6.4 | 0 | 0.84 | 2 | Fail | 14 | Excellent |
| II | None (0%) | 0 | P2 (100%) | 23.6 | 0 | 2.86 | 2 | Fail | 27 | Excellent |
| JJ | None (0%) | 0 | P2 (100%) | 6.9 | 0 | 0.84 | 2 | Fail | 25 | Excellent |

TABLE 2-continued

| Ex. # | Anionic Fluoro-phosphate | Phosphate in mix (g) | Cationic Fluoroacrylate Polymer | Polymer in mix (g) | % F from Phosphate | % F in Soln | Water repellency | Marble etch | Total Stain | Mixture Stability |
|---|---|---|---|---|---|---|---|---|---|---|
| KK | None (0%) | 0 | P1 (100%) | 21.8 | 0 | 2.86 | 2 | Fail | 26 | Excellent |
| LL | None (0%) | 0 | P1 (100%) | 3.8 | 0 | 0.5 | 3 | Fail | 21 | Excellent |
| MM | None (0%) | 0 | P1 (100%) | 1.9 | 0 | 0.25 | 3 | Fail | 23 | Excellent |

*N/A: not applicable.
(a) Control Examples indicate tests on the untreated substrates.

The results in Table 2 showed that the compositions of the present invention exhibit a water repellency score of 4 or below and pass the etch test (Test Method 3). The compositions of the present invention contain not less than 0.3 g cationic copolymer in the mix, at least 75% of the total fluorine content originated from the perfluoroalkyl phosphate, and have a maximum molar ratio of acetic acid (from the cationic copolymer dispersion) to amine or ammonium hydroxide (from the perfluoroalkyl phosphate solution) of 0.6 (see Table 3). Also, all have good, very good or excellent solution stability. Mixture stability was judged without homogenization. Homogenization improves the mixture stability in all cases.

TABLE 3

| | Moles Acid and Base/100 g | | Acid/Base | Ratio = 0.6 |
|---|---|---|---|---|
| Ex. # | Acetic Acid | Diethanolamine or $NH_4^+$ | Ratio$^a$ | or less |
| 1 | 0.908 | 0.733 | 0.0621 | Yes |
| 2 | 0.908 | 0.352 | 0.0325 | Yes |
| 3 | 0.645 | 0.733 | 0.492 | Yes |
| 4 | 0.591 | 0.733 | 0.181 | Yes |
| 5 | 0.645 | 0.733 | 0.166 | Yes |
| 6 | 0.591 | 0.352 | 0.273 | Yes |
| 7 | 0.645 | 0.352 | 0.251 | Yes |
| 8 | 0.591 | 0.733 | 0.191 | Yes |
| 9 | 0.591 | 0.352 | 0.0946 | Yes |
| 10 | 0.645 | 0.352 | 0.0867 | Yes |
| 11 | 0.591 | 0.733 | 0.169 | Yes |
| 12 | 0.645 | 0.733 | 0.155 | Yes |
| 13 | 0.591 | 0.352 | 0.0947 | Yes |
| 14 | 0.591 | 0.352 | 0.0380 | Yes |
| 15 | 0.645 | 0.733 | 0.0726 | Yes |
| 16 | 0.591 | 0.733 | 0.0791 | Yes |
| 17 | 0.645 | 0.352 | 0.0348 | Yes |
| 18 | 0.645 | 0.352 | 0.0867 | Yes |
| 19 | 0.591 | 0.733 | 0.537 | Yes |
| A | 0.591 | 0.733 | 14.39 | No |
| B | 0.591 | 0.352 | 7.379 | No |
| C | 0.645 | 0.733 | 1.455 | No |
| D | 0.645 | 0.352 | 0.763 | No |
| E | 0.645 | 0.733 | 13.19 | No |
| F | 0.645 | 0.733 | 14.10 | No |
| G | 0.591 | 0.352 | 0.833 | No |
| H | 0.591 | 0.733 | 1.588 | No |

$^a$(acetic acid × amount of copolymer dispersion)/(diethanolamine or ammonia × amount of fluorophosphate solution).

What is claimed is:

1. A composition comprising an aqueous first mixture, having a maximum molar ratio of acid to base of 0.6 and providing water repellency having a rating of a maximum of 4 when applied to a substrate surface without etching of said surface, of
   A. an anionic aqueous fluoroalkyl phosphate solution which provides at least about 75% of the total fluorine content of said first mixture comprising
   1) a second mixture of mono(perfluoroalkyl) phosphate and bis(perfluoroalkyl)phosphate of Formula IA, $$[R_f\!-\!(O)_j]_x\!-\!P(O)\!-\!(O^-X^+)_{(3-x)} \qquad \text{Formula 1A}$$

wherein:
   $R_f$ is selected from the group consisting of
   $F(CF_2CF_2)_d(CH_2)_a\!-\!$,
   $F(CF_2CF_2)_dCH_2CH_2(OCH_2CH_2)_b\!-\!$,
   $F(CF_2CF_2)_d\!-\!$,
   $F(CF_2CF_2)_dCH\!=\!CH(CH_2)_c\!-\!$, and
   $C_8F_{17}SO_2N(R_5)CH_2CH_2\!-\!$;
   a is from about 2 to about 10,
   b is from about 3 to about 20,
   c is from about 2 to about 20,
   d is 1 to about 8, or a mixture thereof,
   $R_5$ is H or an aliphatic group containing 1 to about 4 carbon atoms,
   x is from about 1 to about 2,
   j is 1 or 0, or a mixture thereof, and
   X is hydrogen or M,
   M is an ammonium ion, an alkali metal ion, or an alkanolammonium ion, or
   2) a phosphate of the structure of Formula IB

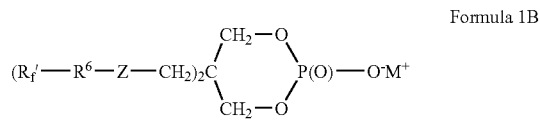

wherein
   $R_f'$ is a fluoroaliphatic group having a linear or branched perfluorocarbon chain having from about 2 to about 20 carbon atoms,
   $R^6$ is an alkylene group having from 1 to about 8 carbon atoms,
   Z is —O—, —S—, or —NH—, and
   M is as defined above in Formula IA, and
   B. a cationic fluoroalkyl(meth)acrylate or perfluoroalkylether(meth)acrylate copolymer present at a minimum of 0.3 g per 100 g of said first mixture, and comprising monomers copolymerized in the following percentages by weight:
   (a) from about 40% to about 92% of at least one monomer of formula 2A $$R_f'\text{-Q-A-C(O)}\!-\!C(R_7)\!=\!CH_2 \qquad \text{2A}$$

wherein:
   $R_f'$ is a fluoroaliphatic group having a linear or branched perfluorocarbon chain having from about 2 to about 20 carbon atoms,
   $R_7$ is H or an aliphatic group containing 1 to about 4 carbon atoms, A is O, S or NR¹ wherein R¹ is H or an alkyl of 1 to about 4 carbon atoms, and Q is alkylene of 1 to about 15 carbon atoms, hydroxyalkylene of 3 to about 15 carbon atoms, —(C$_n$H$_{2n}$)(OC$_q$H$_{2q}$)$_m$—, —SO$_2$—NR¹(C$_n$H$_{2n}$)—, or —CONR¹(C$_n$H$_{2n}$)—, wherein R¹ is H or alkyl of 1 to about 4 carbon atoms, n is 1 to about 15, q is 2 to about 4, and m is 1 to about 15; and R is hydrogen or a C1 about C2 alkyl group,
(b) from about 1% to about 50% of a monomer of formula 2B (CH$_2$=C(R$_7$)COW(CH$_2$)$_r$·⁺NR²R³R⁴)Y⁻   2B wherein R$_7$ is H or an aliphatic group containing 1 to about 4 carbon atoms, R² and R³ are each independently alkyl of 1 to about 4 carbon atoms, hydroxyethyl, or benzyl or R² and R³ together with the nitrogen atom form a morpholine, pyrrolidine, or piperidine ring, R⁴ is alkyl of 1 to about 4 carbon atoms or R², R³, and R⁴ together with the nitrogen form a piperidine ring, W is —O— or —NR⁴—, r is 2 to 4, and Y⁻ is an anion, provided that the nitrogen is from about 40% to 100% quaternized using an acid having a dissociation constant greater than 10⁻⁵; and (c) from 0% to about 20% of an anionic monomer or a monomer which is potentially anionic by varying the pH;

(d) from about 0% to about 10% of a vinyl derivative of formula 2C

R$_8$—CH=CH$_2$   2C wherein

R$_8$ is an alkyl carboxylate or alkyl ether group containing from 1 to about 18 carbon atoms; and (e) from 0 to about 25% of at least one monomer of formula 2D

CH$_2$=C(R$_9$)—C(O)—O—V—OH   2D wherein

R$_9$ is H or an alkyl of 1 to about 4 carbon atoms, and

V is an alkylene of from about 2 to about 4 carbon atoms; and (f) from 0 to about 30% of any monomer other than the monomers of components (a) to (e) described above;

provided that the weight percents for components (a) to (f) described above total 100%.

2. The composition of claim 1 wherein the fluoroalkyl phosphate solution of component A is a mixture of mono (perfluoroalkyl)phosphate and bis(perfluoroalkyl)phosphate of Formula IA.

3. The composition of claim 2 wherein the fluoroalkyl phosphate solution of component A is a mixture of perfluoroalkylethyl phosphate diethanolamine salts.

4. The composition of claim 2 wherein the copolymer of component B is a copolymer prepared by copolymerization of formula 2A and formula 2B.

5. The composition of claim 4 wherein component B is a copolymer of perfluoroalkylethyl(meth)acrylate, and dimethylaminoethyl(meth)acrylate.

6. The composition of claim 1 which provides stain resistance when applied to a substrate surface.

7. The composition of claim 1 further comprising a microbicide.

8. The composition of claim 1 wherein the fluoroalkyl phosphate solution provides about 80% of the total fluorine content.

9. The composition of claim 1 wherein the total fluorine content is from about 0.25 to about 7.5 percent by weight.

* * * * *

UNITED STATES PATENT AND TRADEMARK OFFICE
CERTIFICATE OF CORRECTION

PATENT NO. : 7,592,489 B2  
APPLICATION NO. : 11/200598  
DATED : September 22, 2009  
INVENTOR(S) : Miller et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 852 days.

Signed and Sealed this

Twenty-first Day of September, 2010

David J. Kappos  
*Director of the United States Patent and Trademark Office*